United States Patent
Kim et al.

(10) Patent No.: US 12,454,585 B2
(45) Date of Patent: Oct. 28, 2025

(54) POLYMERIZATION REACTOR FOR PRODUCTION OF SUPER ABSORBENT POLYMER

(71) Applicant: LG Chem, Ltd., Seoul (KR)

(72) Inventors: Minsu Kim, Daejeon (KR); Tae Young Won, Daejeon (KR)

(73) Assignee: LG Chem, Ltd., Seoul (KR)

( * ) Notice: Subject to any disclaimer, the term of this patent is extended or adjusted under 35 U.S.C. 154(b) by 816 days.

(21) Appl. No.: 17/777,798

(22) PCT Filed: Aug. 10, 2021

(86) PCT No.: PCT/KR2021/010600
§ 371 (c)(1),
(2) Date: May 18, 2022

(87) PCT Pub. No.: WO2022/080639
PCT Pub. Date: Apr. 21, 2022

(65) Prior Publication Data
US 2022/0403058 A1    Dec. 22, 2022

(30) Foreign Application Priority Data
Oct. 15, 2020    (KR) .................. 10-2020-0133710

(51) Int. Cl.
*C08F 2/46* (2006.01)
*B01J 19/00* (2006.01)
(Continued)

(52) U.S. Cl.
CPC ............... *C08F 2/46* (2013.01); *B01J 19/008* (2013.01); *B01J 19/08* (2013.01); *B01J 19/10* (2013.01);
(Continued)

(58) Field of Classification Search
None
See application file for complete search history.

(56) References Cited

U.S. PATENT DOCUMENTS 3,346,472 A * 10/1967 Long .................. C08G 18/08
204/157.62
4,446,261 A    5/1984 Yamasaki et al.
(Continued)

FOREIGN PATENT DOCUMENTS

EP    2808077 A1    12/2014
EP    3680009 A2    7/2020
(Continued)

OTHER PUBLICATIONS

Machine translation for Kajikawa (JP 2001-131210 A), publication date May 15, 2001. (Year: 2001).*
(Continued)

*Primary Examiner* — Jennifer A Leung
(74) *Attorney, Agent, or Firm* — Lerner David LLP

(57) ABSTRACT

A polymerization reactor for production of a super absorbent polymer according to the present disclosure includes: a composition supply part for supplying a monomer composition solution; a central pipe connected to the composition supply part; a composition distribution part including a water storage tank located at a discharge port of the central pipe; a distribution pipe connected to the water storage tank; and an ultrasonic device installed inside the water storage tank, a conveyor belt located under the composition distribution part and on which the composition solution is dropped, and an energy supply part for supplying polymerization energy to the composition solution on the conveyor belt, wherein the ultrasonic device supplies bubbles to the composition solution flowing into the water storage tank.

7 Claims, 3 Drawing Sheets

(51) Int. Cl.

| | | |
|---|---|---|
| *B01J 19/08* | (2006.01) | |
| *B01J 19/10* | (2006.01) | |
| *B01J 19/12* | (2006.01) | |
| *B01J 19/22* | (2006.01) | |
| *C08F 2/01* | (2006.01) | |

(52) U.S. Cl.
CPC ........... *B01J 19/123* (2013.01); *B01J 19/124* (2013.01); *B01J 19/126* (2013.01); *B01J 19/128* (2013.01); *B01J 19/22* (2013.01); *C08F 2/01* (2013.01)

(56) References Cited

U.S. PATENT DOCUMENTS

| | | |
|---|---|---|
| 5,859,077 A | 1/1999 | Reichman et al. |
| 2004/0234803 A1 | 11/2004 | Joyce |
| 2008/0171799 A1 | 7/2008 | Redmond et al. |
| 2012/0108695 A1 | 5/2012 | Won et al. |
| 2013/0101851 A1 | 4/2013 | Takaai et al. |
| 2018/0289854 A1 | 10/2018 | Varona et al. |
| 2019/0106551 A1 | 4/2019 | Fischer et al. |
| 2021/0322623 A1 | 10/2021 | Varona et al. |

FOREIGN PATENT DOCUMENTS

| | | |
|---|---|---|
| JP | S56161408 A | 12/1981 |
| JP | S57158209 A | 9/1982 |
| JP | S57198714 A | 12/1982 |
| JP | H067909 B2 | 2/1994 |
| JP | 2001-131210 A | 5/2001 |
| JP | 4312316 B2 | 8/2009 |
| KR | 20150133142 A | 11/2015 |
| KR | 101648138 B1 | 8/2016 |
| KR | 20190039871 A | 4/2019 |
| KR | 20200041644 A | 4/2020 |
| WO | 2008-023648 A1 | 2/2008 |
| WO | 2012002455 A1 | 1/2012 |
| WO | 2018157094 A1 | 8/2018 |

OTHER PUBLICATIONS

Machine translation for Park et al. (KR 2015 0133142 A), publication date Nov. 27, 2015. (Year: 2015).*

Extented European Search Report for Application No. 21880289.0 dated Dec. 12, 2022. 13 pgs.

Zhou, M. et al., "Confinement of Acoustic Cavitation for the Synthesis of Protein-Shelled Nanobubbles for Diagnostics and Nucleic Acid Delivery," ACS Macro Letters, Jun. 2012, pp. 853-856, vol. 1.

Odian, G., "Principles of Polymerization," Second Edition, Dec. 1981, p. 203, John Wiley & Sons.

Schwalm, R., "UV Coatings Basics, Recent Developments and New Applications," Dec. 21, 2006, p. 115, Elservier Science.

International Search Report for Application No. PCT/KR2021/010600 mailed Dec. 3, 2021, pp. 1-3.

* cited by examiner

【FIG. 1】
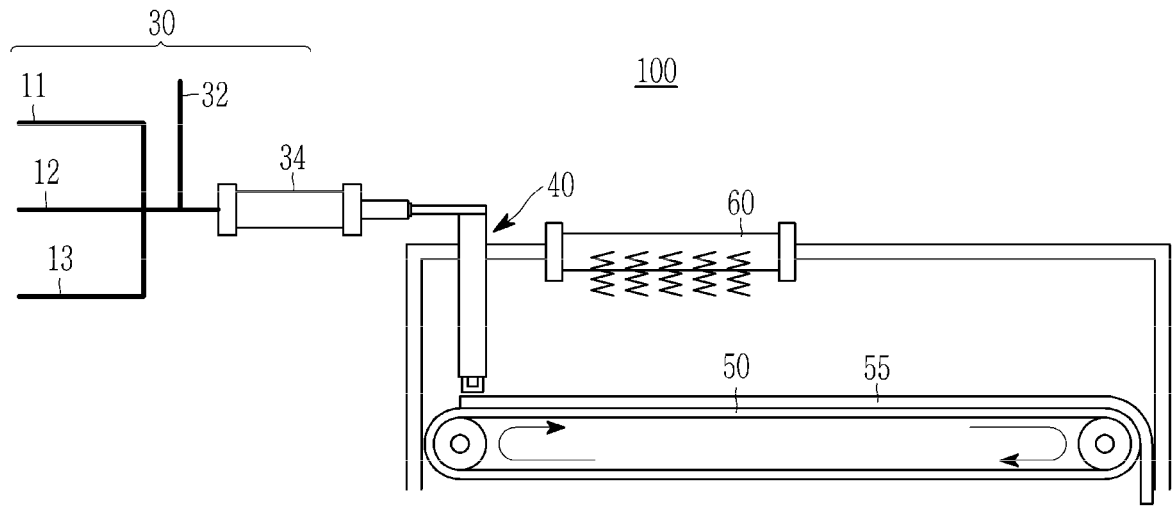
【FIG. 2】
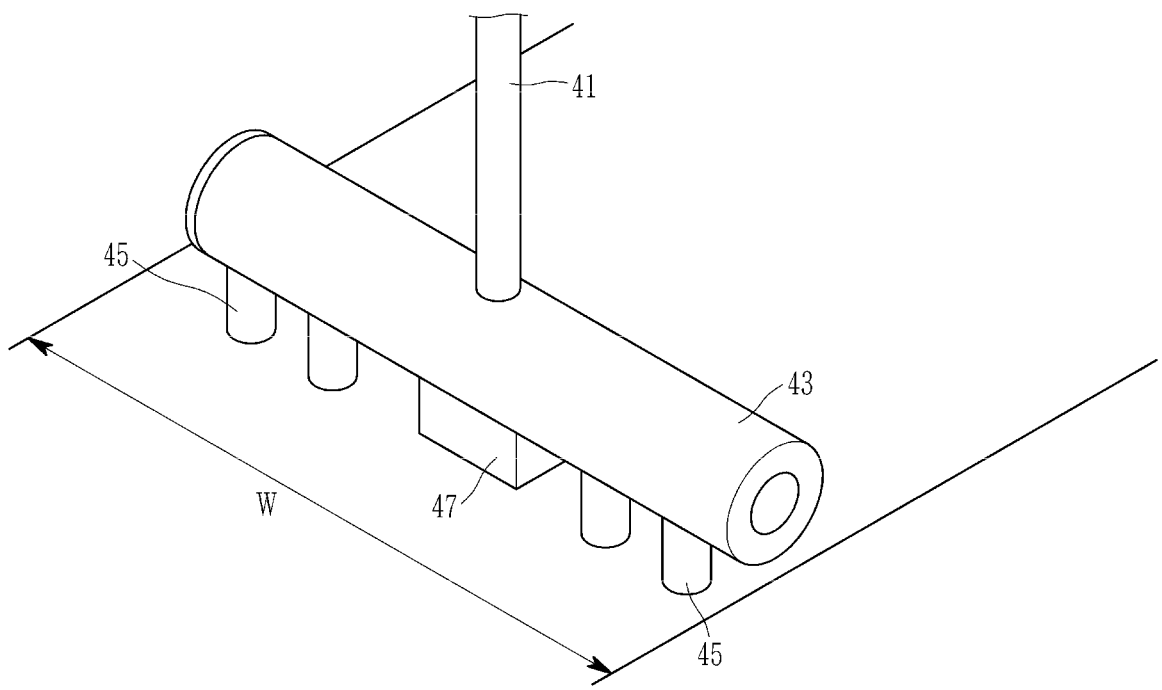

[FIG. 3]
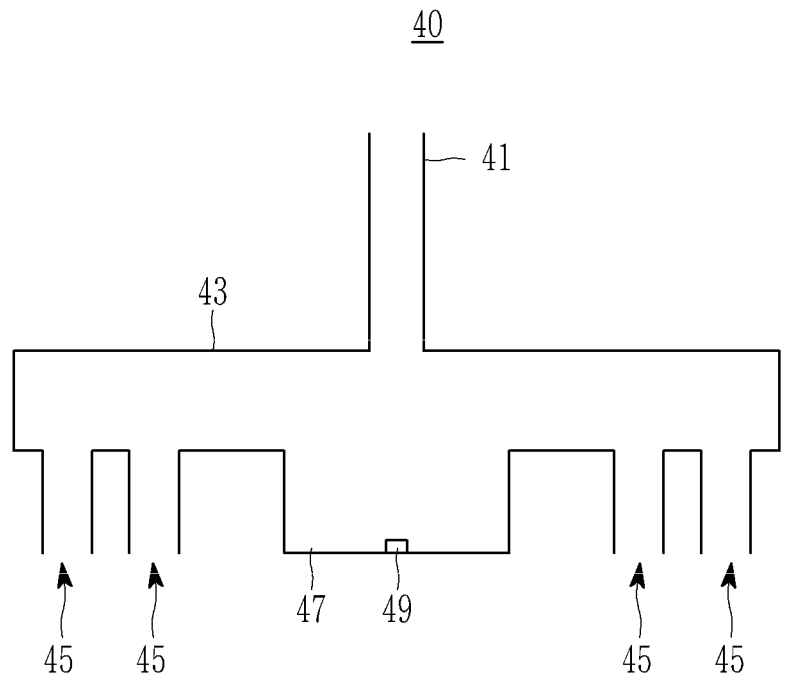
[FIG. 4]
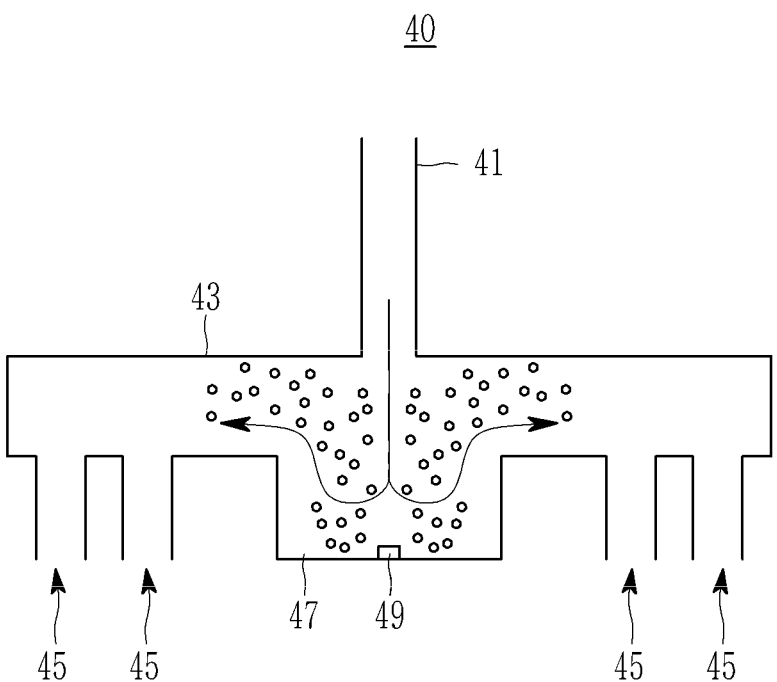

【FIG. 5】
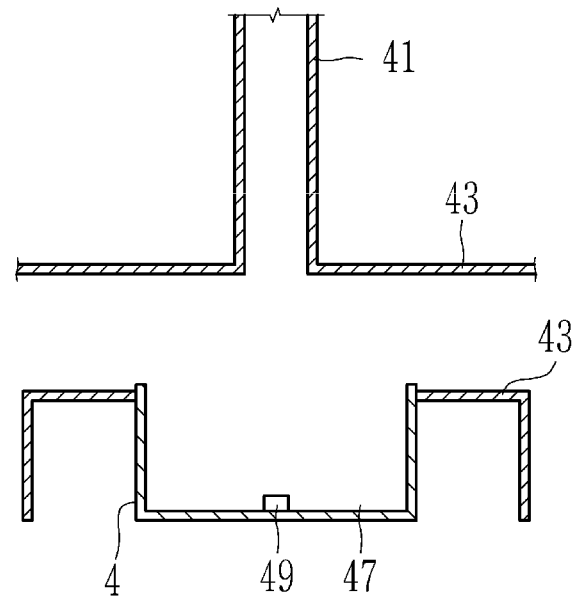
【FIG. 6】
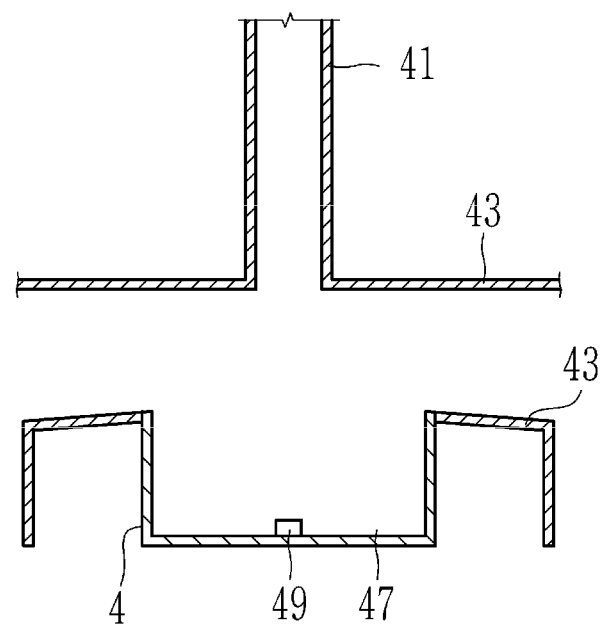

POLYMERIZATION REACTOR FOR PRODUCTION OF SUPER ABSORBENT POLYMER

CROSS-REFERENCE TO RELATED APPLICATION(S)

This application is a national phase entry under 35 U.S.C. § 371 of International Application No. PCT/KR2021/010600, filed on Aug. 10, 2021, which claims priority to Korean Patent Application No. 10-2020-0133710, filed on Oct. 15, 2020, the disclosures of which are incorporated herein by reference in their entirety.

TECHNICAL FIELD

The present disclosure relates to a polymerization reactor for production of a super absorbent polymer.

BACKGROUND OF ART

Super absorbent polymers (SAP) are a type of synthetic polymeric materials capable of absorbing moisture from about 500 to 1000 times its own weight. Various manufacturers have denominated it as different names, such as SAM (Super Absorbency Material), AGM (Absorbent Gel Material), etc. Since such super absorbent polymers started to be practically applied in sanitary products, now they have been widely used not only for hygiene products such as disposable diapers for children, etc., but also for water retaining soil products for gardening, water stop materials for the civil engineering and construction, sheets for raising seedlings, fresh-keeping agents for food distribution fields, materials for poultice, or the like.

As a production process for such super absorbent polymers, a process by reverse phase suspension polymerization and a process by aqueous solution polymerization have been known. The reverse phase suspension polymerization method is disclosed, for example, in Japanese Unexamined Patent Publication Nos. 56-161408 (JPS56161408A; Dec. 11, 1981), 57-158209 (JPS57158209A; Sep. 30, 1982), 57-198714 (JPS57198714A; Dec. 6, 1982), and the like.

The process by the aqueous solution polymerization further includes a thermal polymerization method in which a hydrogel-like polymer is polymerized while being broken and cooled in a kneader equipped with a plurality of shafts, and a photo-polymerization method in which an aqueous solution with a high concentration is irradiated with UV rays onto a belt to perform polymerization and drying at the same time.

Such super absorbent polymers can be generally produced into powdered products by polymerizing monomers for polymer production, and drying and pulverizing them, and the step of polymerizing the monomers is an important step in determining the physical properties of the polymer.

Among the physical properties of the super absorbent polymer, a fast absorption rate is an important physical property, and a chemical foaming agent is added in order to increase the absorption rate.

However, the chemical foaming agent is effective in increasing the absorption rate of the produced super absorbent polymer, but due to the use of the chemical foaming agent, the particle shape of the super absorbent polymer is very irregularly formed.

If the particle shape is irregular in this way, the crushing strength of the produced polymer is not stable during the pulverization/classification process, and thus a super absorbent polymer with desired particle size and physical properties cannot be obtained.

DETAILED DESCRIPTION OF THE INVENTION

Technical Problem

It is an object of the present disclosure to provide a polymerization reactor for production of a super absorbent polymer that contains bubbles, thereby being capable of producing a super absorbent polymer having a uniform particle shape of the super absorbent polymer while improving the absorption rate.

Technical Solution

A polymerization reactor for production of a super absorbent polymer according to the present disclosure includes: a composition supply part for supplying a monomer composition solution, a central pipe connected to the composition supply part, a composition distribution part including a water storage tank located at a discharge port of the central pipe, a distribution pipe connected to the water storage tank, and an ultrasonic device installed inside the water storage tank, a conveyor belt located under the composition distribution part and on which the composition solution is dropped, and an energy supply part for supplying polymerization energy to the composition solution on the conveyor belt, wherein the ultrasonic device supplies bubbles to the composition solution flowing into the water storage tank.

The distribution pipe may include a plurality of discharge ports that discharge the composition solution toward the conveyor belt, and are arranged at regular intervals along the width of the conveyor belt.

The discharge ports of the distribution pipe may be symmetrically arranged on both sides on the basis of the water storage tank.

The composition solution may fill the water storage tank, then overflows from the tank and flow to the distribution pipe.

The central pipe may be located so as to correspond to the center of the water storage tank.

The distribution pipe may be located lower than the end of the side wall of the water storage tank.

The distribution pipe may be inclined to the side wall of the water storage tank.

The composition supply part may further include a raw material supply part, a solvent supply part, and a monomer composition mixing part.

The energy supply part may supply light energy.

Advantageous Effects

The polymerization reactor of the present disclosure sufficiently contains fine bubbles in the composition solution through the ultrasonic generator, thereby being capable of omitting or reducing the step of adding a foaming agent to the composition solution.

In addition, the polymerization reactor uniformly contains fine bubbles, whereby the particle shape of the super absorbent polymer is also uniformly formed, and the non-uniformity of physical properties and the amount of fine powders caused by the foaming agent is reduced, thereby providing a high-quality super absorbent polymer.

BRIEF DESCRIPTION OF THE DRAWINGS

FIG. 1 is a diagram schematically showing a polymerization reactor for production of a super absorbent polymer according to one embodiment of the present disclosure.

FIGS. 2 and 3 are diagrams schematically showing a composition distribution part of a polymerization reactor according to one embodiment of the present disclosure.

FIG. 4 is a view for explaining the composition solution flow in the composition distribution part shown in FIG. 3.

FIGS. 5 and 6 are enlarged views of a part of a polymerization reactor for production of a super absorbent polymer according to another embodiment of the present disclosure.

<Description of Reference Numerals>

| | |
|---|---|
| 11, 12, 13: raw material supply part | 32: solvent supply part |
| 34: composition mixing part | 40: composition distribution part |
| 41: central pipe | 43: distribution pipe |
| 45: discharge port | 47: water storage tank |
| 49: ultrasonic generator | 50: conveyor belt |
| 55: monomer composition | 60: polymerization energy supply part |
| 100: polymerization reactor | |

DETAILED DESCRIPTION OF THE EMBODIMENTS

Hereinafter, embodiments of the present disclosure will be described in detail with reference to the accompanying drawings so that those skilled in the art can easily implement them. The embodiments of the present disclosure can be modified in various different ways, and are not limited to the embodiments set forth herein.

Below, embodiments of the present disclosure will be described in detail with reference to the accompanying drawings.

FIG. 1 is a diagram schematically showing a polymerization reactor for production of a super absorbent polymer according to one embodiment of the present disclosure.

As shown in FIG. 1, a polymerization reactor 100 according to one embodiment of the present disclosure includes a composition supply part 30 for supplying raw materials for polymerization, a composition distribution part 40, a conveyor belt 50, and an energy supply part 60.

The composition supply part 30 includes a plurality of raw material supply parts 11, 12 and 13 for supplying raw materials of the super absorbent polymer, a solvent supply part 32 for supplying a solvent, and a monomer composition mixing part 34 for mixing the raw material and the solvent.

The raw materials of the super absorbent polymer may be, for example, a monomer, a basic compound for neutralizing the monomer, a photo-polymerization initiator, a crosslinking agent, and various additives, and the solvent is not limited as long as it is a liquid capable of dissolving the raw materials. In the drawing, only three raw material supply parts 11, 12, and 13 are shown, but the present invention is not limited thereto and can be variously modified according to the number of raw materials. Further, the solvent can be separately supplied through a solvent supply part 32.

The raw materials and solvent of the super absorbent polymer are uniformly mixed in the monomer composition mixing part 34 to prepare a monomer composition solution, which is then discharged onto the conveyor belt 50 through the composition distribution part 40.

The composition distribution part 40 uniformly discharges the monomer composition mixed in the monomer composition mixing part 34 onto the conveyor belt 50.

The composition mixed from the monomer composition mixing part 34 is supplied to the upper part of the composition distribution part 40, and discharged to the lower part of the composition distribution part 40 while dropping by gravity, so that the composition can be discharged onto the conveyor belt 50.

FIGS. 2 and 3 are diagrams schematically showing a composition distribution part of a polymerization reactor according to one embodiment of the present disclosure, FIG. 4 is a view for explaining the composition solution flow in the composition distribution part shown in FIG. 3, and FIGS. 5 and 6 are enlarged views of a part of a polymerization reactor for production of a super absorbent polymer according to another embodiment of the present disclosure.

Referring to FIGS. 2 and 3, the composition distribution part 40 includes a central pipe 41 and a distribution pipe 43 connected to the central pipe 41.

The central pipe 41 has a tubular shape that is long in the direction of gravity, and can be installed perpendicular to the upper surface of the conveyor belt 50. The composition mixing part 34 can be connected to the upper part of the central pipe 41 (see FIG. 1), and the distribution pipe 43 can be connected to the lower part of the central pipe through which the composition solution is discharged.

The distribution pipe 43 is connected to the lower part of the central pipe 41 and can communicate with the central pipe 41. The central pipe 41 may be the point where the length of the distribution pipe 43 is bisected.

That is, the central pipe 41 can be connected to the center of the distribution pipe 43 so that the composition solution can be equally supplied to both sides on the basis of the center of the distribution pipe 43.

The distribution pipe 43 has a tubular shape that is long in the width (W) direction of the conveyor belt 50, in which a plurality of discharge ports 45 can be formed at one side of the distribution pipe 43 facing the conveyor belt 50. The discharge ports 45 may be arranged at regular intervals along the width (W) direction of the conveyor belt 50.

Meanwhile, the water storage tank 47 can be connected to the center of the distribution pipe 43, and the composition solution dropped through the central pipe 41 is dropped into the water storage tank 47. At this time, the discharge ports 45 of the distribution pipe 43 can be located on both sides on the basis of the water storage tank 47, and can be symmetrically arranged on the basis of the water storage tank 47.

The composition solution is dropped into the water storage tank 47 and fills the water storage tank 47, and the composition solution continuously supplied overflows from the water storage tank 47 and flows to the distribution pipes 43 on both sides.

An ultrasonic generator 49 can be installed inside the water storage tank 47, and the ultrasonic generator 49 is for generating bubbles. The bubbles generated by the ultrasonic generator 49 overflow from the water storage tank 47 in a state of being contained in the composition solution, and are delivered to the distribution pipe 43.

The ultrasonic generator 49 is located in the center of the water storage tank 47, so that the generated air bubbles are not biased to either side of the water storage tank and uniform microbubbles are included in the composition solution. Due to the bubbles generated when the ultrasonic generator 49 is biased to either side, the amount of the composition solution supplied to the distribution pipe 43 may vary.

As shown in FIG. 4, according to the present disclosure, the composition solution stays for a period of time while it fills the water storage tank 47 with dropping. Therefore, microbubbles generated through the ultrasonic generator 49 are moved to the distribution pipe 43 in a state of being sufficiently contained in the composition solution. Further, the composition solution supplied after filling moves to the lower part of the water storage tank, and the pre-stored composition solution moves to the upper part of the water storage tank in a state of containing bubbles, then overflows the side wall of the water storage tank and flows to the distribution pipe 43.

At this time, the capacity of the water storage tank 47 can be selected according to the quantity of microbubbles required.

As described above, according to the present disclosure, microbubbles are sufficiently contained in the composition solution through the ultrasonic generator 49, whereby the process of adding a foaming agent to the composition solution can be omitted or reduced. Therefore, it is possible to reduce the non-uniformity of physical properties and the amount of fine powder caused by the foaming agent, thereby providing a high-quality super absorbent polymer.

Meanwhile, in order to easily move the composition solution overflowing from the water storage tank 47 to the distribution pipe 43 and prevent the solution from reversely flowing and again flowing to the water storage tank 47, the distribution pipe 43 can be connected below the side wall 4 of the water storage tank 47 as shown in FIG. 5. Further, as shown in FIG. 6, it may be inclinedly connected to the side wall 4 of the water storage tank.

Again, referring to FIG. 1, the conveyor belt 50 is a place where the composition solution is discharged through the composition distribution part 40, and a polymerization reaction occurs while the composition solution is moved onto the conveyor belt 50.

The monomer composition solution 55 supplied onto the conveyor belt 50 moves from one end of the conveyor belt 50 to the other end according to the movement of the conveyor belt 50. As described above, the composition solution 55 undergoes a crosslinking polymerization reaction by the polymerization energy supplied from the energy supply part 60 during movement.

The energy supply part 60 is for supplying light energy or thermal energy required for monomer polymerization, and may be located at the upper part of the conveyor belt 50.

The energy supply part 60 is not limited in the configuration, as long as it can transfer polymerization energy to the composition solution 55 for producing the super absorbent polymer. However, it may be at least one selected from the group consisting of an ultraviolet irradiation part, a hot air supply part, a microwave irradiation part, and an infrared irradiation part.

Further, in some cases, the energy supply part 60 can be installed in plural numbers along the longitudinal direction of the conveyor belt 50. In addition, the installation position of the energy supply part 60 may preferably be one side of the conveyor belt 50 to which the composition solution 55 is supplied and polymerization is initiated.

The polymerized sheet-like polymer gel is discharged to the outside of the polymerization reactor through a polymerization gel discharge part (not shown), and coarse pulverization may be performed in the additionally connected polymer gel pulverization part.

Meanwhile, the polymer gel pulverization part is not limited in the configuration as long as it includes a pulverization device capable of coarsely pulverizing the sheet-like polymer gel.

Specifically, any one selected from the crusher group consisting of a vertical pulverizer, a turbo cutter, a turbo grinder, a rotary cutter mill, a cutter mill, a disc mill, a shred crusher, a crusher, a chopper, and a disc cutter can be exemplified, but they are not limited to the above-mentioned examples.

At this time, in the coarse pulverization step, the polymerized gel can be pulverized so as to have a particle size of about 2 to about 10 mm.

The coarsely pulverized polymer gel can be dried so that the water content of the polymer is about 1 to about 5%, and then pulverized so as to have a particle size of about 150 to about 850 mm.

Specific examples of the pulverizing device used for pulverizing the dried polymer include a pin mill, a hammer mill, a screw mill, a roll mill, a disc mill, a jog mill, and the like, but the present disclosure is not limited to the above-described examples.

Further, the polymer obtained after pulverization can undergo a separate process of classifying the polymer according to particle size. Preferably, the polymer having a particle diameter of about 150 to about 850 μm can be classified.

A method of producing the super absorbent polymer using the polymerization reactor for production of the super absorbent polymer according to the embodiment of the present disclosure described above will be described.

The method for producing the super absorbent polymer of the present disclosure includes a step of preparing a composition solution containing a water-soluble ethylenically unsaturated monomer, a polymerization initiator, and a solvent, a step of filling the water storage tank including the ultrasonic generator 49 shown in FIGS. 2 and 3 and then flowing along the distribution pipe to supply the composition solution onto the conveyor belt, and a step of subjecting the composition solution to thermal polymerization or photo-polymerization while moving the conveyor belt of the polymerization reactor and the composition solution.

The raw materials of the super absorbent polymer may include a monomer, a basic compound for neutralizing the monomer, a polymerization initiator, a crosslinking agent, and various additives.

The monomer can be used without limitation in the constitution, as long as it is a monomer commonly used in the production of the super absorbent polymer. As the monomer, any one or more selected from the group consisting of an anionic monomer and salts thereof, a nonionic hydrophilic monomer, and an amino group-containing unsaturated monomer and a quaternary compound thereof can be used.

Specifically, any one or more selected from the group consisting of: an anionic monomer such as (meth)acrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid, and salts thereof; a nonionic hydrophilic monomer such as (meth)acrylamide, N-substituted (meth)acrylate, 2-hydroxyethyl(meth)acrylate, 2-hydroxypropyl(meth)acrylate, methoxy polyethylene glycol (meth)acrylate, or polyethylene glycol (meth)acrylate; and an amino group-containing unsaturated monomer such as (N,N)-dimethylaminoethyl (meth)acrylate or (N,N)-dimethylaminopropyl(meth)acrylamide, and a quaternary ammonium compound thereof can be preferably used.

The concentration of the monomer can be appropriately selected and used in consideration of the polymerization time, reaction conditions, and the like.

The basic compound can be used without limitation in the constitution as long as it is a compound that is dissolved in water to exhibit basicity. Such basic compounds can be selected, for example, from alkali metal hydroxides such as potassium hydroxide and sodium hydroxide; hydrides such as lithium hydride and sodium hydride; amide compounds such as lithium amide, sodium amide, and potassium amide; alkoxide compounds such as sodium methoxide and potassium methoxide; and combinations thereof.

The basic compound may be contained in an amount of 7 to 20% by weight based on the total content of the monomer composition solution.

The monomer composition solution contains a polymerization initiator, and when ultraviolet rays are irradiated from the polymerization energy supply part, it may include a photo-polymerization initiator, while when hot air is supplied, it may include a thermal polymerization initiator and the like.

As the thermal polymerization initiator, any one or more selected from the group consisting of a persulfate-based initiator, an azo-based initiator, a peroxide-based initiator, hydrogen peroxide, and ascorbic acid can be used. Specific examples of the persulfate-based initiator may include sodium persulfate ($Na_2S_2O_8$), potassium persulfate ($K_2S_2O_8$), ammonium persulfate (($NH_4)_2S_2O_8$) and the like, and examples of the azo-based initiator include 2,2-azobis(2-amidinopropane)dihydrochloride), 2,2-azobis-(N,N-dimethylene)isobutyramidine dihydrochloride, 2-(carbamoylazo)isobutylonitrile, 2,2-azobis[2-(2-imidazolin-2-yl)propane] dihydrochloride, 4,4-azobis-(4-cyanovaleric acid), and the like. More various thermal polymerization initiators are well disclosed in "Principle of Polymerization (Wiley, 1981)" written by Odian, p. 203, however, they are not limited to the above-mentioned examples.

As the photo-polymerization initiator, any one or more compounds selected from the group consisting of benzoin ether, dialkyl acetophenone, hydroxyl alkyl ketone, phenyl glyoxylate, benzyl dimethyl ketal, acyl phosphine, and α-aminoketone may be used. Meanwhile, specific examples of acyl phosphine may include commercially available Lucirin TPO, namely, 2,4,6-trimethyl-benzoyl-trimethyl phosphine oxide. More various photo-polymerization initiators are well disclosed in "UV Coatings: Basics, Recent Developments and New Applications (Elsevier, 2007)" written by Reinhold Schwalm, p. 115, however, they are not limited to the above-mentioned examples.

As the crosslinking agent, one kind or a combination of two or more kinds selected from a diacrylate-based crosslinking agent including hexanediol diacrylate, ethylene glycol diacrylate, diethylene glycol diacrylate, triethylene glycol diacrylate, propylene glycol diacrylate, dipropylene glycol diacrylate, and tripropylene glycol diacrylate; a triacrylate-based crosslinking agent; an aziridine-based crosslinking agent; an epoxy-based crosslinking agent; and the like.

The crosslinking agent may be contained in an amount of about 0.01 to about 0.5% by weight based on the total content of the monomer composition.

Additives may include a thickener, a plasticizer, a preservation stabilizer, an antioxidant, and the like.

The monomer, basic compound, polymerization initiator, crosslinking agent, and additive can be prepared in the form of a solution dissolved in a solvent.

In this case, the solvent can be used without limitation in the constitution as long as it can dissolve the above-mentioned components. For example, one kind or a combination of two or more kinds selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butyrolactone, carbitol, methyl cellosolve acetate, N,N-dimethylacetamide, and the like can be used.

The solvent may be included in the residual quantity excluding the components disclosure above based on the total content of the monomer composition.

The composition solution is supplied from the composition mixing section 34 of the polymerization reactor, and is dropped onto the conveyor belt 50 through the distribution pipe 43 together with bubbles generated through the ultrasonic generator.

In this case, the composition solution may be supplied in a predetermined amount at regular intervals along the width of the conveyor belt.

In the production method of the super absorbent polymer according to the present disclosure, the composition solution containing bubbles is supplied to the conveyor belt as described above, thereby being capable of producing a super absorbent polymer having a uniform particle shape.

The polymerization reaction may proceed by receiving the supply of light such as ultraviolet light from the light irradiation part.

After progressing polymerization of the composition solution, the super absorbent polymer can be produced through a process such as pulverizing and drying the polymerization result, and processes such as pulverization and drying may be performed according to a conventional method for producing a super absorbent polymer.

For example, the polymer sheet in the pulverizing step can be pulverized into a size of usually several to several hundred millimeters.

Although the present disclosure has been described with reference to the embodiments shown in the accompanying drawings, it is to be understood that the present disclosure is not limited thereto, but on the contrary, various modifications or other embodiments can be made within the scope equivalent to the present disclosure by those skilled in the art. Therefore, the true scope of protection of the present disclosure should be defined by the following claims.

The invention claimed is:

1. A polymerization reactor for production of a super absorbent polymer, the reactor comprising:
   a composition supply part configured to supply a monomer composition solution;
   a central pipe connected to the composition supply part and located so as to correspond to a center of the water storage tank;
   a composition distribution part including a water storage tank located at a discharge port of the central pipe, a distribution pipe connected to the water storage tank, and an ultrasonic device installed inside the water storage tank;
   a conveyor belt located under the composition distribution part and on which the composition solution is dropped; and an energy supply part for supplying polymerization energy to the composition solution on the conveyor belt, wherein the ultrasonic device supplies bubbles to the composition solution flowing into the water storage tank, wherein the distribution pipe is inclined to a side wall of the water storage tank.

2. The polymerization reactor according to claim 1, wherein the distribution pipe comprises a plurality of discharge ports configured to discharge the composition solution toward the conveyor belt, which are arranged at regular intervals along the width of the conveyor belt.

3. The polymerization reactor according to claim 2, wherein the discharge ports of the distribution pipe are symmetrically arranged on both sides on the basis of the water storage tank.

4. The polymerization reactor according to claim 1, wherein the water storage tank is configured to be filled by the composition solution, which then overflows from the tank and flows to the distribution pipe.

5. The polymerization reactor according to claim 1, wherein the distribution pipe is located lower than an end of a side wall of the water storage tank.

6. The polymerization reactor according to claim 1, wherein the composition supply part further comprises a raw material supply part, a solvent supply part, and a monomer composition mixing part.

7. The polymerization reactor according to claim 1, wherein the energy supply part is configured to supply light energy.

* * * * *